United States Patent [19]
Bucher

[11] Patent Number: 5,421,014
[45] Date of Patent: May 30, 1995

[54] METHOD FOR CONTROLLING MULTI-THREAD OPERATIONS ISSUED BY AN INITIATOR-TYPE DEVICE TO ONE OR MORE TARGET-TYPE PERIPHERAL DEVICES

[75] Inventor: Steven Bucher, St. Paul, Minn.

[73] Assignee: I-Tech Corporation, Edina, Minn.

[21] Appl. No.: 93,513

[22] Filed: Jul. 19, 1993

Related U.S. Application Data

[63] Continuation of Ser. No. 552,438, Jul. 13, 1990, abandoned.

[51] Int. Cl.⁶ .......................... G06F 3/00; G06F 9/00; G06F 13/00
[52] U.S. Cl. .................................... 395/650; 395/325; 364/DIG. 1; 364/281.3; 364/281.4; 364/281.7; 364/239.9; 364/242.5
[58] Field of Search ................. 395/650, 700, 325, 275

[56] References Cited

U.S. PATENT DOCUMENTS

| | | | |
|---|---|---|---|
| 4,106,092 | 8/1978 | Millers, II | 364/200 |
| 4,449,182 | 5/1984 | Rubinson et al. | 364/200 |
| 4,847,755 | 7/1989 | Morrison et al. | 395/650 |
| 5,067,104 | 11/1991 | Krishnakumar et al. | 395/375 |
| 5,073,854 | 12/1991 | Martin et al. | 364/425 |
| 5,127,098 | 6/1992 | Rosenthal et al. | 395/650 |
| 5,142,677 | 8/1992 | Ehlig et al. | 395/650 |
| 5,179,702 | 1/1993 | Spix et al. | 395/650 |
| 5,201,049 | 4/1993 | Shorter | 395/650 |

OTHER PUBLICATIONS

Information Technology–Small Computer System Interface-2; Editor–Lawrence J, Lamers, Sep. 7, 1993.

*Primary Examiner*—Eddie F. Chan
*Attorney, Agent, or Firm*—Patterson & Keough

[57] ABSTRACT

A software architecture and method for controlling multi-thread peripheral operations in an initiator device such as a computer equipped with a SCSI interface. A data structure is provided for storage of thread context parameters. High level code places a low level driver in either a single-thread or multi-thread mode, and then issues peripheral commands by calling the low level driver. The low level driver manages the interface protocol, returning to the high level code when a command is complete, or if in multi-thread mode, when a command disconnects. Management of the data structure is accomplished by the low level driver, minimizing the impact of multi-thread operations on the high level code.

6 Claims, 10 Drawing Sheets

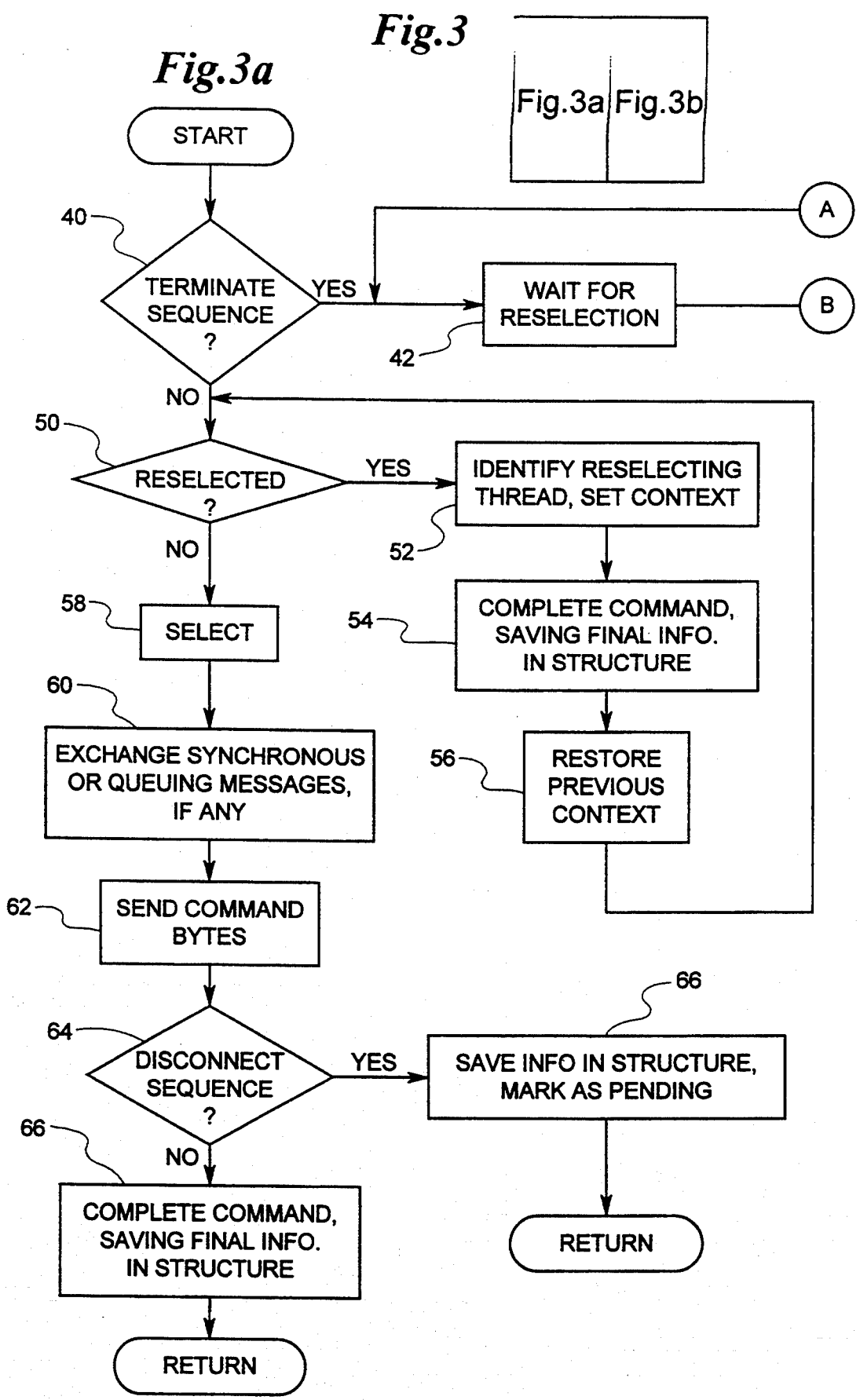

*Fig.5*

```
STRUCT MTS {    /* STRUCTURE FOR MULTI-THREAD SUPPORT    */
    UNSIGNED CHAR TID;          /* TARGET ID                          */
    UNSIGNED CHAR LUN;          /* LOGICAL UNIT NUMBER                */
    UNSIGNED CHAR QUE_MSG;      /* QUEUE MESSAGE VALUE, 0= NONE       */
    UNSIGNED CHAR QUE_TAG;      /* QUEUE TAG VALUE                    */
    UNSIGNED CHAR CMD [12];     /* COMMAND BYTES                      */
    UNSIGNED INT DATA_PTR;      /* DATA POINTER                       */
    UNSIGNED CHAR RET_ST;       /* RETURNED STATUS                    */
    UNSIGNED CHAR EXP_ST;       /* EXPECTED STATUS                    */
    UNSIGNED CHAR FLAG;         /* INDICATES EXECUTION PROGRESS       */
} LPS [MTS_SIZE+1];
```

Fig.6a

```
/* SET MT_MODE BIT FOR MULTI-THREAD OPERATIONS */
   MT_MODE ( );

/* INITIALIZE THREAD CONTEXT PARAMETERS */
   TID (0);
   LUN (0);
   SET_DATA_PTR ( 0x0000 );

/* CALL DRIVER, INITIALIZE COMMAND BYTES */
   IO6 ( 0x08, 0x00, 0x00, 0x01, 0x01, 0x00 );

/* RETRIEVE RESULTS FOR ALL COMPLETED COMMANDS */
   WHILE ( CMD_COMPLETE ( ) ) {
       RET_RESULTS ( );
   }

/* INITIALIZE NEW THREAD CONTEXT PARAMETERS */
   TID (1);
   SET_DATA_PTR ( 0x0200 );

/* CALL DRIVER, INITIALIZE COMMAND BYTES */
   IO6 ( 0x08, 0x00, 0x00, 0x02, 0x01, 0x00 );

/* SET MT_TERM BIT, CALL DRIVER, TERMINATE MULTI-THREAD OPS */
   MT_TERM ( );

/* RETRIEVE RESULTS FOR ALL COMPLETED COMMANDS */
   WHILE ( CMD_COMPLETE ( ) )   {
       RET_RESULTS ( );
   }
```

Fig.6b

```
/* INITIALIZE THREAD CONTEXT PARAMETERS */
    TID (0);
    LUN (0);
    SET_DATA_PTR ( 0x0000 );

/* CALL DRIVER, INITIALIZE COMMAND BYTES */
    IO6 ( 0x08, 0x00, 0x00, 0x01, 0x01, 0x00 );

/* RETRIEVE RESULTS FOR THE COMPLETED COMMAND */
    WHILE ( CMD_COMPLETE ( ) )   {
        RET_RESULTS( );
    }

/* INITIALIZE NEW THREAD CONTEXT PARAMETERS */
    TID (1);
    SET_DATA_PTR ( 0x0200 );

/* CALL DRIVER INITIALIZE COMMAND BYTES */
    IO6 ( 0x08, 0x00, 0x00, 0x02, 0x01, 0x00 );

/* RETRIEVE RESULTS FOR THE COMPLETED COMMAND */
    WHILE ( CMD_COMPLETE ( ) )   {
        RET_RESULTS ( );
    }
```

SINGLE INITIATOR, SINGLE TARGET

SINGLE INITIATOR, MULTIPLE TARGETS

MULTPLE INITIATOR, MULTIPLE TARGET

METHOD FOR CONTROLLING MULTI-THREAD OPERATIONS ISSUED BY AN INITIATOR-TYPE DEVICE TO ONE OR MORE TARGET-TYPE PERIPHERAL DEVICES

This application is a continuation of application Ser. No. 07/552,438, filed on Jul. 13, 1990, now abandoned.

TECHNICAL FIELD

This invention pertains to methods of controlling multi-thread operations in an initiator device. More specifically, this invention pertains to communications between a computer and peripheral devices, and methods of controlling multiple pending threads of communication between an initiator device and one or more target devices.

BACKGROUND OF THE INVENTION

The performance of computer systems depends in large part upon the efficiency of communications between the computer and peripheral storage devices such as disk drives. The amount of time it takes for data to be stored on or retrieved from a disk drive is considerable when compared to the time it takes for the computer to operate on the data once retrieved. A substantial portion of the time it takes for data to be stored on or retrieved from a disk drive is spent waiting for the disk drive to physically locate the correct data location.

It is known in the art that the performance of a computer system can be improved by allowing the computer to perform other operations while waiting for the disk drive to locate the desired data. It is also known that the computer may even request data from a second disk drive while waiting for the first to locate the required data.

In a typical computer system, multiple peripherals will be electrically connected to a computer over a common bus. A disk drive operation involves the computer sending information to a disk drive over the bus, thereby informing the disk drive of the task required. While the disk drive is positioning its read/write head so as to access the correct data location, the computer is idle and is theoretically free to perform other tasks. These other tasks may involve communication with other peripheral devices on the bus.

For purposes of the present invention, a communication between two devices such as a computer and a disk drive will be referred to as a thread. Single threading means that only one thread (communication) is active at a time. In single-threaded computer system, the computer completes a command to one disk drive prior to issuing a command to another disk drive. Multi-threading occurs if multiple threads are active simultaneously. In a multi-threaded computer system, the computer may issue a command to a second disk drive prior to completion of a previously issued command to a first disk drive.

Multi-threading is accomplished by temporarily suspending execution of one thread and beginning execution of another, eventually restoring the suspended thread to complete its execution. In order to perform multi-threaded operations, the computer is required to internally store context information for multiple threads, update context information at appropriate times during execution of the thread, and uniquely identify threads and the context information related to each of the threads.

Prior art methods of managing multi-threaded operations have involved older peripherals and interface technologies. Lacking internal intelligence, peripheral operations were performed under the direct control of the computer or a separate controller, with the computer acting as a "Master" and the peripheral device acting as a "Slave". Under this arrangement, the computer (or controller) was empowered to make peripheral context switches (switches between threads) whenever it determined that a switch was appropriate.

With the advent of intelligent interfaces such as the Small Computer Systems Interface (SCSI), controller operations are now built into the disk drive itself, and the computer no longer governs the details of disk drive operation. As such, the computer no longer has access to enough information to determine the appropriateness of a task switch in a multi-threaded environment. In SCSI, the computer doesn't even control the sequence of communication between the computer and the disk drive. Rather than acting as a Master, the computer acts as an "Initiator" device, in that the computer initiates the establishment of thread communication, and issues commands. The peripheral device no longer acts as a Slave, but rather as a "Target" device, in that it receives commands from an Initiator, but executes them under the control of its own intelligence.

Since the computer does not control the sequence of communication, it is left with no means to suspend thread execution, thereby depriving the computer of the capability to autonomously make the task switch decision as required in prior art multi-threaded environments.

For example, in older systems, the computer or controller kept track of where the data head in a disk drive was physically positioned. Based upon this information, the computer could determine how long it would take for the head to be repositioned to a desired new location, and thus could decide whether there was sufficient time to begin execution of other threads while waiting. With embedded SCSI interface drives, the physical location of the data head is not known to the computer, and thus there is insufficient information for the computer to determine how long repositioning of the head will take and whether a context switch would be advantageous. Furthermore, because the communication phases in SCSI are controlled by the Target device, the computer is left without a means to suspend thread execution. Thus, in a SCSI system the decision to suspend thread execution can be made only by the disk drive controller, after which the computer may or may not choose to begin execution of another thread.

This represents a relatively new philosophy in computer peripheral management, and requires that the computer treat peripheral operations in a new manner. Prior art multi-threading provides neither the software nor the peripheral driver structure necessary for multi-thread operations in this new environment.

In addition, prior art multi-threading has been used primarily in larger systems due to its complexity and the fact that it generally provides benefit only where there are multiple peripheral devices attached to the same computer. As users of small computer systems continue to demand increased performance, and as small computers are used to perform more advanced tasks, small computer systems are more often being equipped with multiple peripheral devices. This provides both the opportunity and the need for multi-threading in the peripheral architectures of smaller computer systems.

Unfortunately, incorporating prior art multi-threading techniques into modern small systems architectures would involve substantial rewriting of existing operating systems and peripheral handling routines.

As multi-threading of peripheral operations using newer intelligent interfaces becomes more common, there is also a need for peripheral manufacturers to efficiently test peripheral devices for proper multi-thread operation. In the same way that it is desirable to avoid excessive rewriting of existing operating systems, it is also desirable to avoid substantial re-writing of existing peripheral test sequences.

It is clear that there is a need for a method of controlling peripheral multi-thread operation for use with modern intelligent peripheral interfaces. It is also clear that there is a need for a multi-thread control method which is structured in such a way as to minimize the impact of adding multi-thread support to existing operating system and peripheral tester code.

SUMMARY OF THE INVENTION

In accordance with the present invention, a software architecture is provided for implementing multi-thread control in an Initiator device. This is done through a low level driver method which simplifies high level multi-thread control, and minimizes the impact of adding multi-thread support to existing test sequences and to the peripheral handling routines of existing operating systems. The present invention accomplishes this through the use of a data structure for storing thread context information for multiple threads, and appropriate management of the data structure by the low level driver, thereby limiting the impact on existing operating systems and test sequences to setting a multi-thread mode prior to issuing commands to peripheral devices.

The data structure provides multiple entries for storing the context of multiple threads. In each entry, there is storage for the parameters necessary to identify the thread, which in the example of the SCSI interface includes an Initiator I.D. (IID), Target I.D. (TID), Logical Unit Number (LUN), and a Queue Tag. In addition, the structure has storage for various thread context information, such as the command bytes which identify the command being executed by this thread, a data pointer indicating the progress of any data transfer operation which is part of this command, a status byte for storing the command execution status from the Target device, a message byte for storing a command complete message from the Target device, and a progress flag for indicating the execution progress of the thread in the entry.

In the preferred embodiment of the present invention, SCSI commands are initiated by means of a function call to a low level driver, which handles the execution of the command from start to finish, saving execution status to report back to the high level operating system or test sequence. If commands are initiated after placing the driver into multi-thread mode, then the driver will execute the command up until the point where the Target device disconnects from the bus, at which point the driver returns to the high level code so as to allow the operating system or test sequence to issue other commands to other threads.

In order to accomplish this, the low level driver must maintain cognizance of the thread identification it is currently executing, and must update thread information in the appropriate data structure entry at strategic times during execution of the command. In this way, the low level driver relieves the high level operating system or test sequence code of the burden of managing multi-thread operations, thereby minimizing the impact of multi-thread support on existing operating system and test sequences.

In an alternate embodiment of the present invention, multiple thread entries in the thread context data structure are initialized with thread information prior to calling the low level driver. When called, the low level driver executes the commands initialized into the data structure one at a time, moving on to the next thread in the structure upon disconnect or command complete of the thread currently being executed. The low level driver returns control to the high level operating system or test sequence when all threads initialized into the data structure have executed to completion.

Thus it is a primary object of the present invention to provide a method of managing multi-threaded peripheral operations in a low level driver, simplifying high level control of multi-threaded peripheral operations.

Another objective of the present invention is to provide a structure for a low level driver capable of supporting multi-thread operations in an Initiator device.

Yet another objective of the present invention is to allow existing operating systems and test sequences to be easily modified for multi-thread support with a minimum amount of rewrite.

These and other objects of the present invention will become apparent with reference to the drawings, the detailed description of the preferred embodiment and the appended claims.

DESCRIPTION OF THE DRAWINGS

FIG. 5 shows the 'C' code for a data structure with multiple entries, each entry providing storage for appropriate thread context information.

FIGS. 6A and 6B show example code sequences for operating in a single-thread and multi-thread mode, respectively.

DESCRIPTION OF THE PREFERRED EMBODIMENTS

The present invention is described in terms of a computer system using the SCSI interface for peripheral communications. Those skilled in the art will recognize that the scope of the invention extends to any Initiator device using any interface. Those not versed in the protocol details of SCSI are referred to the SCSI-2 specification developed and published by the ANSI X3T9.2 committee, and which is hereby incorporated by reference.

Figure 7:
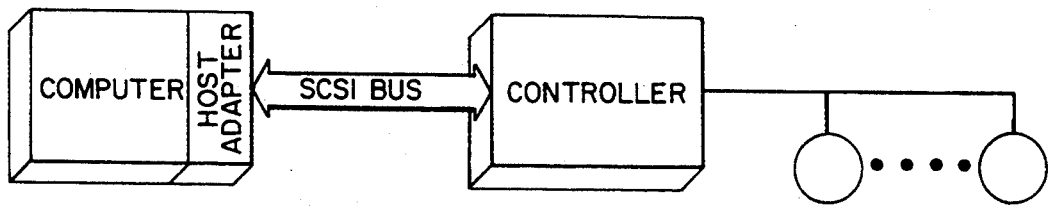
FIGS. 7, 8 and 9 show various a sample configurations for devices using a SCSI intelligent communication interface.
Figure 8:
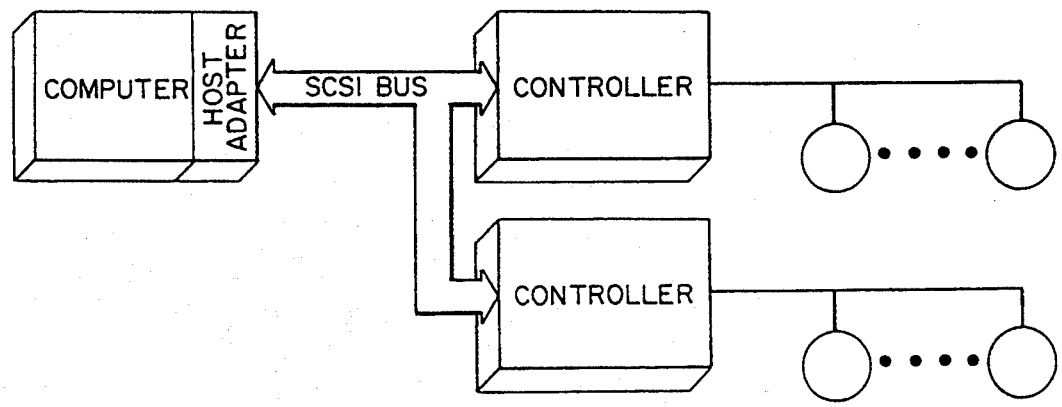
Figure 9:
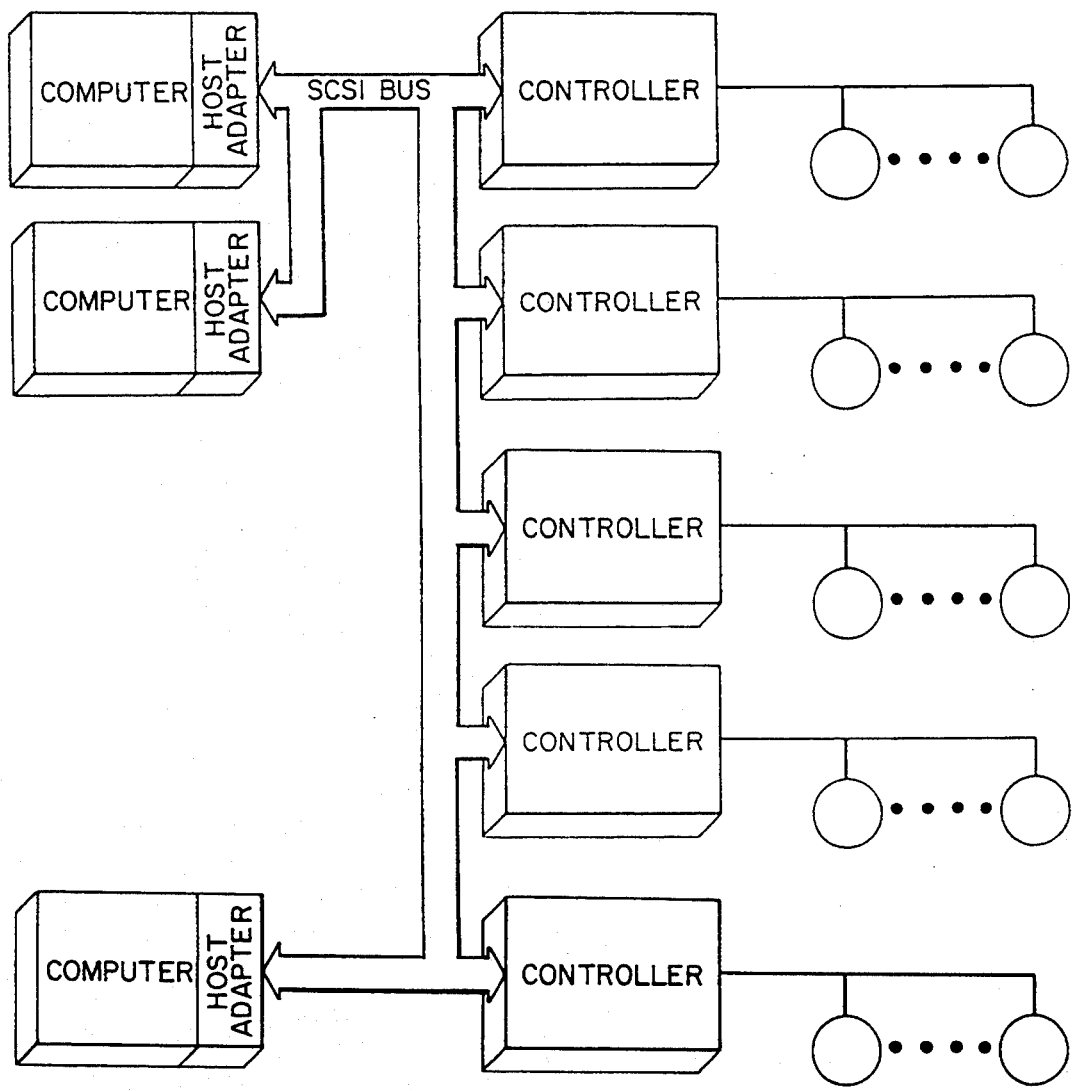

With reference to FIGS. 7, 8 and 9, and as described in Section 5.5 of the X3T9.2 SCSI standard, communication on a SCSI bus 100 is allowed between only two SCSI devices 102a, 102b, (FIG. 7), 104a, 104b, 104c (FIG. 8) or 106a–106g (FIG. 9) at any given time. There is a maximum of eight SCSI devices 102, 104, 106. Each SCSI device has a SCSI ID bit assigned in the data field defined for SCSI bus 100. While three sample configurations are shown in FIGS. 7, 8 and 9, it will be understood that there can be any combination of initiator and target device provided there is at least one of each.

When two SCSI devices 102, 104, 106 communicate on SCSI bus 100, one device acts as an initiator and the other acts as a target. The initiator originates an operation and the target performs the operation. Most SCSI devices 102, 104, 106 usually have a fixed role as either an initiator or a target, but some SCSI devices may be able to assume either role. An initiator device may address up to eight peripheral devices that are connected to a target. The target may be physically housed with the peripheral device, in which case the peripheral device is referred to as an embedded SCSI device.

Certain SCSI bus functions are assigned to the initiator and certain SCSI bus functions are assigned to the target. The initiator may arbitrate for the SCSI bus and select a particular target. The target may request the transfer of COMMAND, DATA, STATUS or other information on the DATA BUS, and in some cases may arbitrate for the SCSI bus and reselect an initiator for the purpose of continuing an operation. Information transfers on the DATA BUS are asynchronous and follow a defined REQ/ACK handshake protocol. One byte of information may be transferred with each handshake on an A cable of SCSI bus 100 and, if the wide data transfer option is implemented, one or three bytes of information may be transferred with each handshake on a B cable of SCSI bus 100. An option is also defined in the SCSI standard for synchronous data transfer.

In the present invention, the phrase "high level code" refers to any operating system, tester, or other application code, the organizational structure of which is oriented toward commands. The phrase "low level driver" refers to drivers and other low level code which is not oriented toward commands, but rather toward the protocol segments which in combination comprise an entire command. For example, in SCSI, high level code would issue a read command, while the low level driver would perform the protocol segments (select, command phase, data phase, etc.) necessary for execution of the read command.

Figure 1:
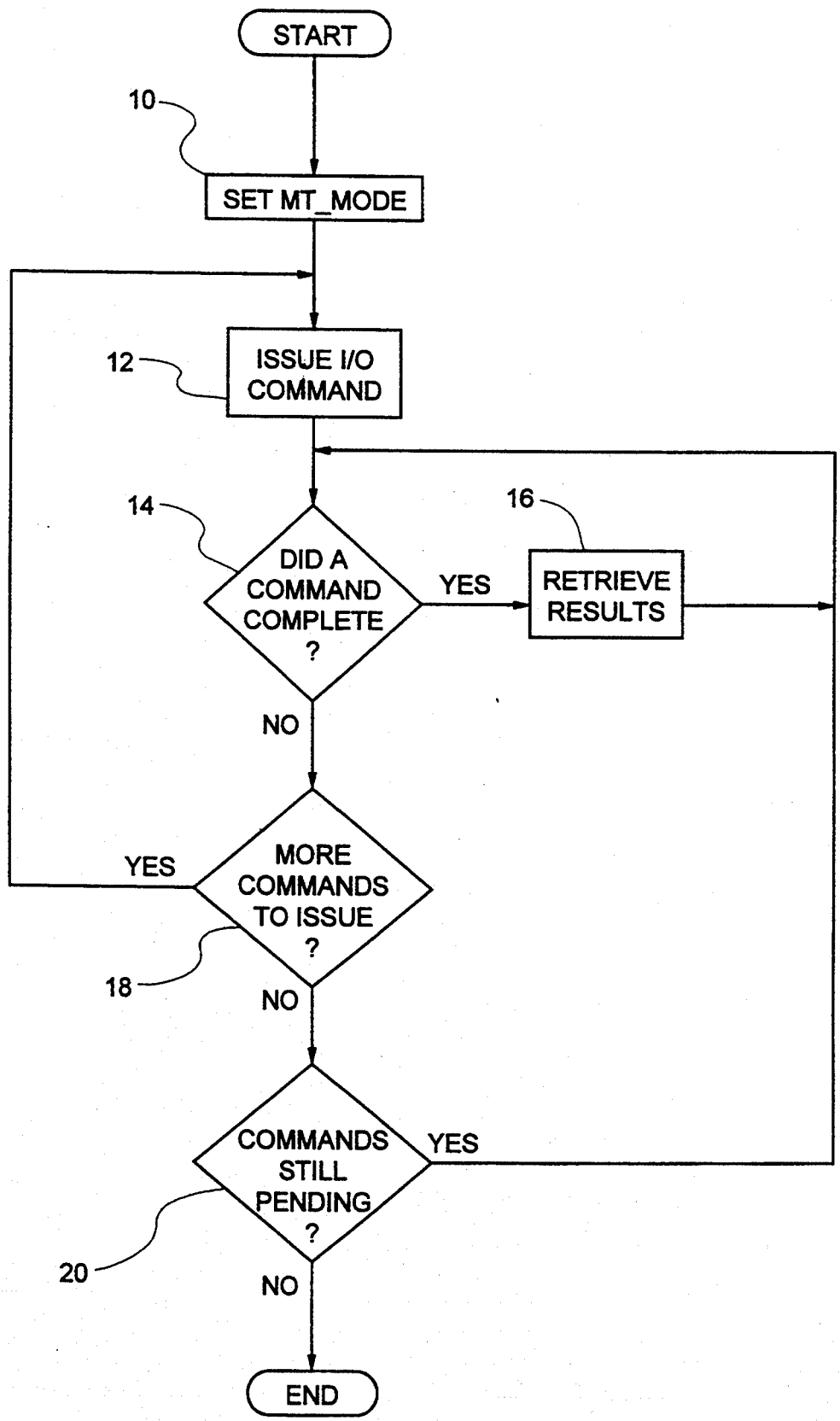
FIG. 1 shows a flow chart of a high level procedure for operating in a multi-thread mode.

Referring now to FIG. 1, a flow chart of a high level procedure for operating in a multi-thread mode is shown. When the high level code (operating system or test sequence) desires to issue commands to peripheral devices in a multi-thread fashion, a multi-thread mode bit $mt_{13}$ mode is set 10. The high level code then issues an I/O command 12 to the desired peripheral. In the preferred embodiment, the programming is done in 'C', and the I/O command is issued via a function call to the low level driver, which will be described in greater detail in reference to FIGS. 2–4. Those skilled in the art will recognize that the structure and methods disclosed are equally applicable to other programming languages.

Upon return from the low level driver, the issued command may have completed, or its execution may have been suspended due to the Target device disconnecting from the bus. The high level code then determines whether any commands previously issued have completed 14. If so, then it can retrieve the execution results 16 (such as execution status or data transferred) as desired. The high level code then checks again for commands that have completed 14, and retrieves the results 16, repeating the process until results have been retrieved for every command which has completed.

If the high level code has more commands to issue to peripheral devices 18, then it simply issues them 12 and repeats the process. If there are no more commands to be issued, and if at least one previously issued command has yet to complete 20, then the high level code loops through steps 14–20 until all commands have completed and all results have been retrieved.

By operating this way, the high level code issues commands in a particular order, but is unaware of the order in which the commands will complete. The order in which the commands complete becomes known only as the commands actually complete and the high level code retrieves the results from the completed commands.

The step shown in FIG. 1 as checking for completed commands 14 preferably includes a call to the low level driver, since actual command completion cannot occur without code execution by the low level driver. This step involves a call to the driver, a check for Target device reselections on the bus, completion of the command, and indicating the completion to the high level driver. This process is discussed in more detail in reference to FIG. 3. Alternately, if the high level code is multi-tasking, a processor time slice could be allocated to the low level driver to allow it to complete commands to any reselecting Target devices.

Although other similar code structures are possible consistent with the scope of the present invention, in the preferred embodiment it is important that the high level code retrieve the results from the commands as they complete in order to allow the context of completed commands to be cleared from the data structure which stores the context information. The data structure will be discussed in more detail in reference to FIG. 5. If completed commands are not cleared from the structure, the possibility exists that the structure will fill, terminating the high level code's ability to issue new commands.

As an example of operation in a multi-thread mode, the flow diagram of FIG. 1 will now be described in terms of a typical series of peripheral operations from the perspective of the high level code. The high level code will first set the mt_mode bit 10, which indicates to the low level driver that multi-thread operations are desired. The first command is then issued by calling the low level driver 12, which handles the interface protocol in a manner as will be discussed in reference to FIGS. 2–4. Since the mt_mode bit is set, the driver will return to the high level code when the Target to which the command was issued disconnects from the bus.

Presuming that the first command will remain disconnected for a substantial period of time, there will be no completed commands 14 for the high level code to retrieve results from 16. If there is a second command to issue 18, then the high level code calls the driver again to issue the second command 12. Again, the driver returns to the high level code when the second command is suspended due to a disconnection from the bus.

Assuming that neither of the command have yet completed 14, and that the high level code has no more commands to issue 18, the code continues to loop while there are pending commands to complete 20. When it detects that either of the commands have completed 14, it retrieves the results 16 and continues to loop until the other command terminates as well.

In an alternative embodiment to that shown in FIG. 1, when there are no more commands to issue, the pending commands can be terminated by setting a mt_term bit and calling the low level driver. The mt_term bit would indicate to the driver that it should not return to the high level code until all pending commands have completed. Driver operation according to this embodiment is more fully described in reference to FIG. 3.

To operate in a single-thread mode, the high level code would not set the mt_mode bit 10, resulting in the low level driver returning to the high level code only after the issued command has completed. There would always be a completed command 14, results would be retrieved 16, and more commands would be issued 18 if desired. When there were no more commands to issue 18, there would be no commands still pending 20, and the process would end.

From this description, it is seen that the impact of multi-thread support on a high level method of issuing commands is negligible, that being merely to set the multi-thread mode bit mt_mode 10.

It will be noted that the method of the present invention does not eliminate all impact on the high level code, but only that associated with the issuance of commands to peripheral devices. Namely, the high level code must be capable of handling the completion of the commands in an order other than that in which they were issued, since the completion order in SCSI is determined in part by the Target devices.

Figure 2:
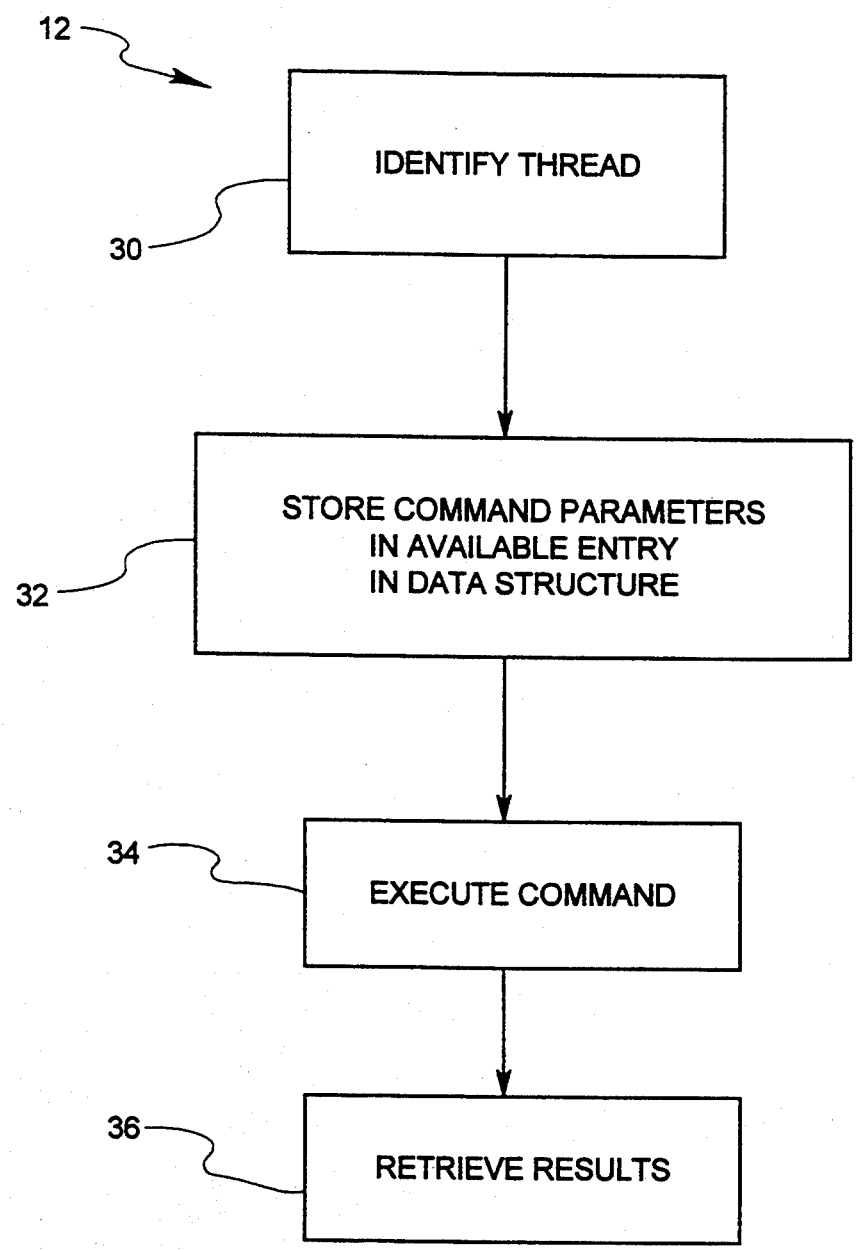
FIG. 2 shows a flow chart of the "issue I/O command" portion of FIG. 1, as executed by a driver management level.

Referring now to FIG. 2, a flowchart of the "issue I/O command" 12 portion of FIG. 1 is shown according to a preferred embodiment of the present invention. This routine 12 is preferably executed by a management level of code within the driver, and handles some of the housekeeping tasks related to multi-thread operation prior to entering the phase handling portion of the low level driver code. The driver management code first identifies the thread 30 of the command issued by the high level code. The identify of a thread is expressed as a combination of the Target I.D. (TID) of the desired peripheral, the Logical Unit Number (LUN) of the logical unit within the desired peripheral, and a Command Queue Tag, if any. These thread context parameters are then stored in an available entry in the data structure 32, as are the command bytes of the command issued by the high level code. The entry in the data structure is thus identified with a specific execution thread, and the low level driver will be able to find the entry in order to store execution parameters, as will be discussed in reference to FIGS. 3 and 4.

Once the thread parameters are stored in the data structure, the phase handling portion of the low level driver is called so as to execute the command 34. Upon return from the phase handling portion of the low level driver, the driver management code can retrieve results 36 of command execution, such as execution status, error status, or execution progress.

The presence of a "retrieve results" step 36 in FIG. 2 and a "retrieve results" step 14 in FIG. 1 show alternate embodiments for retrieving the results, and indicates only that upon return from the low level driver code, there will be results of some sort for either the high level code or the driver management level code to retrieve.

Figure 3B:
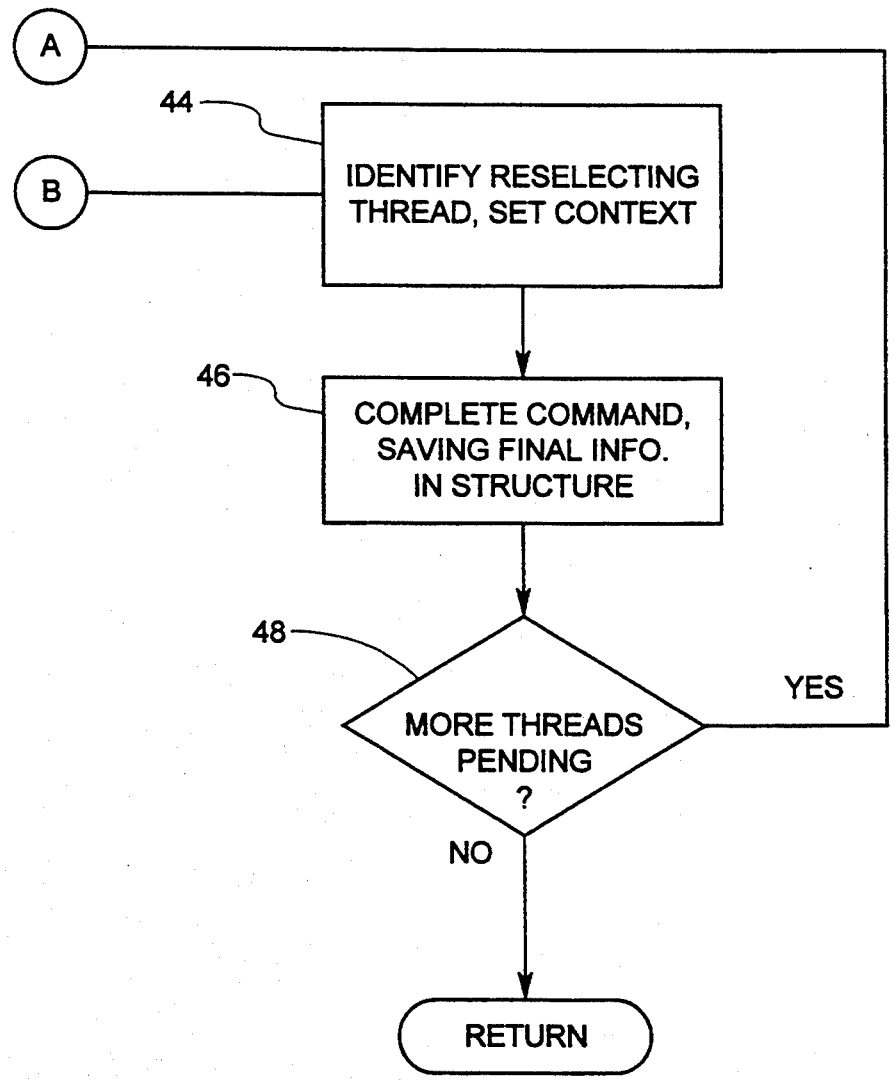
FIG. 3, comprising 3a and 3b, shows a flow chart of the overall strategy of a low level driver for controlling a multi-thread mode of operation.

Referring now to FIG. 3, a flowchart of the strategy of low level driver according to the preferred embodiment of the present invention is shown. Upon entering the low level driver, a check is first made to determine if the high level code wants to terminate all pending threads 40. If so, the driver waits for reselection from a Target device 42, identifies the reselecting thread and sets the context 44 according to the thread parameters stored in the data structure, and completes the command, saving results in the data structure 46. If more threads are still pending 48, the low level driver loops back to again wait for reselection 42. When no more threads are pending 48, the low level driver returns to the high level code.

If the high level code has not specified a terminate sequence 40, then the low level driver checks to see if there is a reselection from a Target device 50. If there is a reselection, the driver completes the command in the usual way, identifying the reselecting thread and setting the new context 52, completing the command and saving results in the data structure 54. Upon completion of the command, the previous context is restored 56 and another check is made for a Target reselecting 50.

If no Targets have reselected, the low level driver then selects the desired Target 58 as requested by the high level code. Synchronous messages and command queuing messages are exchanged (if any) 60, followed by command bytes being sent to the Target 62. If the Target device decides to disconnect from the bus 64 and the mt_mode bit is set, then the low level driver saves context information in the data structure, and marks the thread as pending 66 before returning to the high level code. If there is no disconnect sequence 64, the command is completed as usual 66, followed by a return to the high level code.

Figure 4:
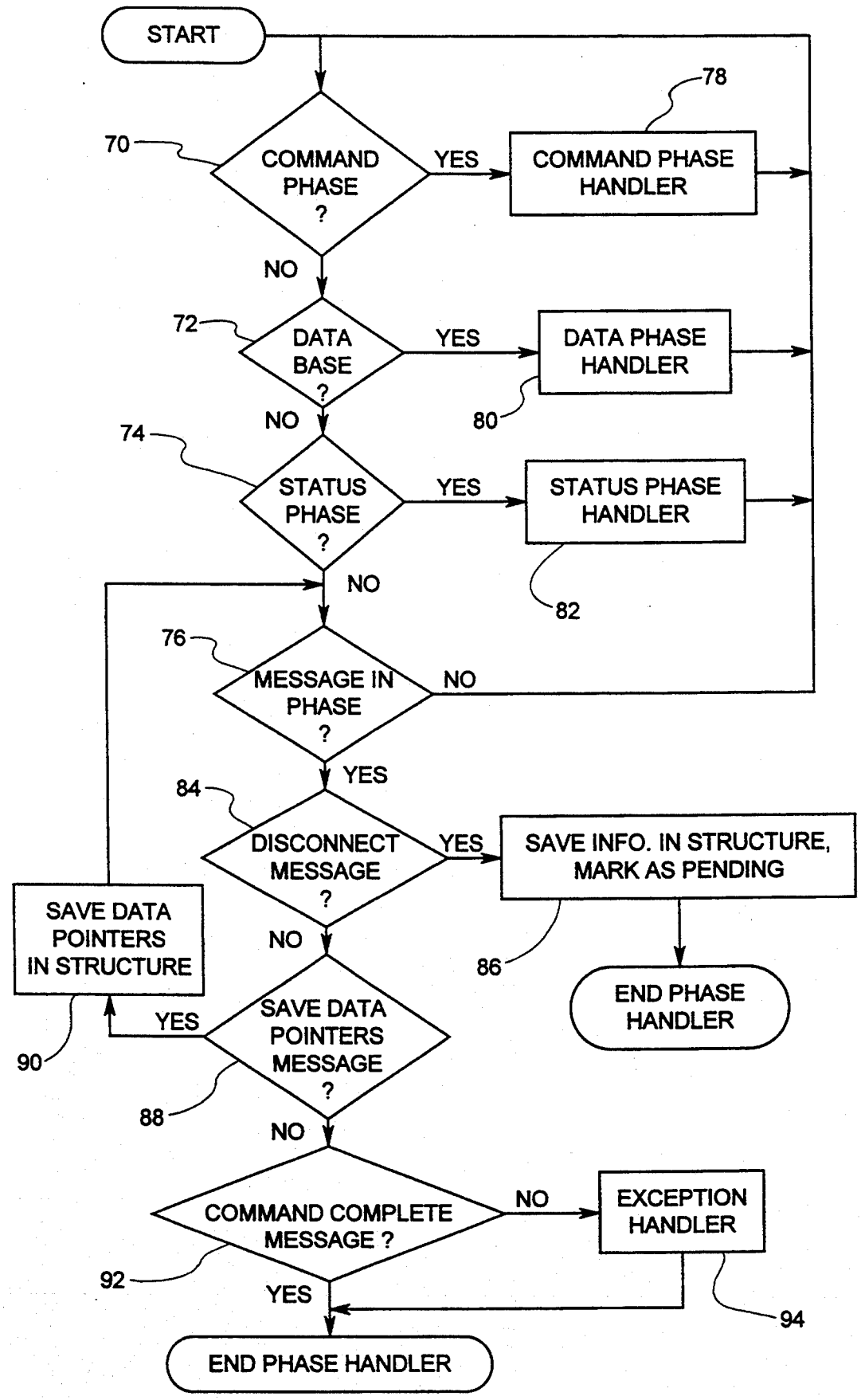
FIG. 4 shows a flow chart of a phase handling portion of a low level driver, and showing the integration of the strategy of FIG. 3 into an actual driver.

Referring now to FIG. 4, a flow chart of a phase handling portion of a low level driver is shown. An Initiator device must respond to the phase sequence determined by the Target device, so upon entry into the phase handler, a check is made to see which of the possible phases currently exists on the bus, command phase 70, data phase 72, status phase 74, or message in phase 76. Depending upon which phase is present, an appropriate phase handler 78, 80, 82 is executed. If the phase is a message in phase 76, a message in phase handler takes the message and determines whether it is a disconnect message 84, which indicates that the target device is disconnecting from the bus. In the event that the Target is disconnecting, thread context information is saved in the data structure, and the thread is marked as pending 86.

If the message is a save data pointers message 88, then the data pointers, which are part of the thread context, are updated in the data structure 90. If the message is a command complete message 92, then the phase handler marks the thread as complete in the data structure and returns to the high level code. An exception handler 94 is provided for handling unexpected messages from the Target device.

Referring now to FIG. 5, a portion of the 'C' code for a SCSI implementation of the data structure of the present invention is shown. The code allocates a data structure for storing thread context information. The structure consists of MTS_SIZE+1 entries, with each entry in the structure containing each of the thread context parameters for the thread to be stored in the entry. The number of entries needed depends upon the application. For example, if used in an operating system environment, 16 entries would likely be sufficient for small to medium size systems, where due to the number of peripheral devices, there are unlikely to be more than 16 uniquely identifiable threads possible. In a tester environment, many more entries may be necessary to allow the tester to fill the Target device's internal command queue, depending upon the depth provided in the Target device under test.

The variables stored in each entry include those necessary to identify the thread: tid, lun, and que_tag. In SCSI, there may or may not be a que_tag, and threads are identified differently depending upon whether a que_tag is used. For this reason, the variable que_msg indicates whether a queue tag message is sent, and what type it is. More information on tagged command queuing can be obtained from the "Queue Tag Messages" section of the SCSI-2 specification, published by the X3T9.2 committee of ANSI.

Note that the Initiator ID is not stored in the data structure. This is due to the fact that the computer does generally alter its IID, and thus the IID is the same for all threads and need not be stored in the structure entry. Of course, if in a particular application of the present invention, the computer did alter its IID, this would have to be stored in the structure as well, so as to be able to correctly identify the threads.

Additional variables stored in each structure entry include the command bytes which define the command being executed by the thread in the entry, and a pointer into a data buffer used for data transfer commands. For a tester environment, it is desirable to save the status expected to be returned from the Target after command execution, for comparison with the status actually returned from the Target. In an operating system environment, this may be unnecessary, since it is unlikely that the operating system would intentionally issue a command resulting in the Target returning an error status.

The flag variable is used to indicate the execution progress of the thread stored in the entry. For example, the value of the flag variable could have the following meanings:

| | |
|---|---|
| 0 × 00 | structure entry is available |
| 0 × 01 | entry initialized for execution |
| 0 × 02 | thread is currently executing |
| 0 × 03 | thread is disconnected (pending) |
| 0 × 04 | execution complete, results available |

The low level driver would then update the flag variable at the appropriate times during operations on the thread.

Those skilled in the art will recognize that the disclosed structure is an example only, and that variations can be made within the scope of the present invention depending upon the application. For example, the variables that are used to identify the thread will be different if an interface other than SCSI is used. In addition, other variables such as diagnostic bytes or sense bytes may be added to the structure, to be updated by the low level driver, without departing from the scope of the invention.

Referring now to FIGS. 6A and 6B, example 'C' code segments for high level code operations in multi-thread and single thread mode are shown, respectively. In multi-thread mode, mt_mode is set to indicate that multi-thread operations are desired. Target ID, Logical Unit Number, and the data pointer are global variables, and are initialized for the command to be issued. The driver is then called with the desired command bytes as passed parameters. The driver then locates an available entry in the structure and copies the global variables and the command bytes into the corresponding variables in the structure entry. Execution of the command continues within the low level driver until the Target device disconnects from the bus.

Upon return to the high level code, the results are gathered for all completed commands. In this example, there will probably not be any completed commands since only one has been issued, and the command bytes define a read command which is likely to be disconnected for a long period of time relative to the execution speed of the high level code. The Target ID is then changed so as to issue the next command to a different Target device, and the data pointer is set so that there is no conflict in data buffer usage between the two commands. The second command is then issued, multi-thread operations are terminated, and the results of both commands are retrieved.

Referring now to FIG. 6B, a similar section of high level code is shown, but without setting the mt_mode bit or terminating multi-thread mode at the end. Aside from this, the code is identical to that shown in FIG. 6A. In retrieving results, there will always be exactly one command completed, and so the "while()" loop is somewhat extraneous in the single-thread example of FIG. 6B, but its presence shows how little impact the multi-thread system of the present invention can have on high level code. From the comparison of FIGS. 6A and 6B, changing from a single-thread mode to a multi-thread mode is simply a matter of setting a mode bit at the beginning, and terminating multi-thread operations at the end.

In a tester environment, it may be advantageous to load the data structure with many commands, prior to calling the low level driver, and then instructing the low level driver to execute all the loaded commands before returning. This avoids the overhead of returning back to the high level test code prior to the execution of each command. To facilitate operation in this manner requires only minimal modification to the embodiments previously described, and can be easily accomplished by a programmer skilled in the art.

The driver of FIG. 3 would be equipped with an "auto" mode, wherein execution does not return to the high level code after the disconnect sequence 64, 66 and the command complete sequence 64, 68, but rather loops back to the start of the driver process to execute the next loaded command in the data structure. If no more commands are loaded, the driver initiates a terminate sequence, and returns to the high level code when the terminate sequence has completed.

In addition to the low level driver modification, the high level code would be provided with a function which loads a command into an available entry in the structure, and immediately returns to the high level code without any execution of the loaded command.

Those skilled in the art will recognize that while the above description is given in terms of the SCSI interface, the invention is equally applicable to any intelligent peripheral interface where commands to peripherals are executed by the intelligence within the peripheral rather than by the computer. Further, those skilled in the art of the SCSI interface will recognize that while most of the thread identification discussion involved IID, TID, and LUN as uniquely identifying the thread, the SCSI-2 specification recognizes command queue tags as an additional identifier, and it too is needed to uniquely identify threads in systems where command queue tags are supported.

Although the description of the preferred embodiments have been presented, it is contemplated that various changes could be made without deviating from the spirit of the present invention. Accordingly, it is intended that the scope of the present invention be dictated by the appended claims rather than by the description of the preferred embodiment.

What is claimed is:

1. In a computing processing system having at least one high level computing system and at least one initiator-type computing device having a memory and a processor for issuing peripheral commands to one or more target-type peripheral devices connected to the initiator-type computing device via an intelligent communication interface operating in accordance with a protocol defined for a Small Computer Systems Interface (SCSI) standard, an improved method for controlling multi-thread initiator-type operations between the initiator-type computing device and the one or more target-type peripheral devices, each of the initiator-type operations comprising one or more peripheral commands received by the initiator-type computing device from one of the at least one high level computing system that will be initiated by the initiator-type computing device and communicated across the intelligent communication interface to be completed by a selected one of the target-type peripheral devices, the improved method comprising the processor-implemented steps for each initiator-type computing device of:
   (a) providing a data structure in the memory of each of said initiator-type computing device for storing one or more thread context parameters for each of a plurality of thread entries for which execution will be initiated by that initiator-type computing device one thread entry at a time;
   (b) receiving from one or more high level computing systems at least a first set of thread context parameters corresponding to a first peripheral command and a second set of thread context parameters corresponding to a second peripheral command;
   (c) storing in the data structure the first set of thread context parameters in an available thread entry corresponding to the first peripheral command and the second set of thread context parameters in an available thread entry corresponding to the second peripheral command to create a context for a first thread entry and a second thread entry, respectively;
   (d) initiating the first peripheral command to a target peripheral device indicated by the first peripheral command using the context for the first thread entry, the step of initiating being accomplished in accordance with the protocol defined for the SCSI standard and including the steps of:
      (d1) selecting the target peripheral device indicated by the first peripheral command to logically connect to that initiator-type computing device across the intelligent communication interface;
      (d2) communicating the first peripheral command to the target peripheral device indicated by the first peripheral command; and
      (d3) monitoring the intelligent communication interface until the target peripheral device indicated by the first peripheral command logically disconnects from the intelligent communication interface;
   (e) switching contexts to the context for the second thread entry;
   (f) initiating the second peripheral command to a target peripheral device indicated by the second peripheral command using the context for the second thread entry the step of initiating being accomplished in accordance with the protocol defined for the SCSI standard and including the steps of:
      (f1) selecting the target peripheral device indicated by the second peripheral command to logically connect to that initiator-type computing device across the intelligent communication interface;
      (f2) communicating the second peripheral command to the target peripheral device indicated by the second peripheral command; and
      (f3) monitoring the intelligent communication interface until the target peripheral device indicated by the second peripheral command logically disconnects from the intelligent communication interface; and
   (g) monitoring the intelligent communication interface for a reselection of the initiator-type computing device by a target peripheral device,
      wherein step (f) is accomplished and the second peripheral command is initiated before the first peripheral command is completed.

2. The method according to claim 1 wherein the first peripheral command is received, executed and logically disconnected before the second peripheral command is received, and wherein step (g) comprises the steps of:
   (g1) checking the intelligent communication interface for a reselection from any previously disconnected peripheral command;
   (g2) switching contexts to the context of the thread entry of the previous disconnected peripheral command if the reselection is present; and
   (g3) completing the previously disconnected peripheral command if the reselection is present.

3. In a computing device processing system having at least one high level computing system and at least one initiator-type computing device having a memory and a processor for issuing peripheral commands to one or more target-type peripheral devices connected to the initiator-type computing device via an intelligent communication interface operating in accordance with a protocol defined for a Small Computer Systems Interface (SCSI) standard, an improved method for controlling multi-thread initiator-type operations between the initiator-type computing devices and the target-type peripheral devices over the intelligent communication interface, each of the initiator-type operations comprising one or more peripheral commands received by the initiator-type computing device from one of the at least one high level computing system that will be initiated by the initiator-type computing device and communicated across the intelligent communication interface to be completed by a selected one of the target-type peripheral devices, the improved method comprising the processor-implemented steps for each initiator-type computing device of:
   (a) providing a data structure in the memory of each of said initiator-type computing device for storing one or more thread context parameters for each of a plurality of thread entries;
   (b) storing the thread context parameters for multiple peripheral commands in multiple thread entries;
   (c) calling a low level driver routine that implements the peripheral commands whose thread context parameters are stored in the data structure, wherein the low level driver implements the peripheral commands one at a time and in accordance with the protocol defined for the SCSI standard by performing the following steps:

(c1) logically connecting across the communication interface to a target-type peripheral device indicated by a first peripheral command;

(c2) communicating the first peripheral command to the target-type peripheral device;

(c3) monitoring the communication interface until the target-type peripheral device to which the first peripheral command has been issued logically disconnects from the communication interface;

(c4) monitoring the communication interface for active communications on the communication interface;

(c5) in response to no active communications from step (c4), issuing a subsequent peripheral command by performing steps (c1)–(c3) for the subsequent peripheral command; and (c6) in response to active communications from step (c4), completing any previously disconnected peripheral commands where the target-type peripheral device has reselected the initiator-type device on the communication interface; and (c7) repeating steps (c4)–(c6) until all thread entries stored in the data structure have completed.

4. The method of claim 3 wherein the plurality of thread context parameters within each of the plurality of thread entries in the memory comprises a storage location for thread identification parameters and a storage location for a thread execution progress flag.

5. The method of claim 4 wherein the plurality of thread context parameters within each of the plurality of thread entries in the memory further comprises:

one or more command bytes that identify the peripheral commands being executed by the thread;

a data pointer indicating the progress of any data transfer operation that is part of the peripheral command being executed by the thread;

a status byte for storing the command execution status as received from the target-type peripheral device; and a message byte for storing a command complete message as received from the target-type peripheral device.

6. The method of claim 2 wherein steps (g1)–(g3) are also performed prior to step (e).

* * * * *